United States Patent
Kang et al.

(10) Patent No.: US 10,580,541 B2
(45) Date of Patent: Mar. 3, 2020

(54) APPARATUS AND SYSTEM FOR SIMULATING MAINTENANCE OF REACTOR CORE PROTECTION SYSTEM

(71) Applicant: DOOSAN HEAVY INDUSTRIES & CONSTRUCTION CO., LTD., Changwon-si, Gyeongsangnam-do (KR)

(72) Inventors: Changhun Kang, Yongin-si (KR); Baegyo Jo, Yongin-si (KR); Sanghoon Lee, Yongin-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 323 days.

(21) Appl. No.: 15/617,487

(22) Filed: Jun. 8, 2017

(65) Prior Publication Data
US 2018/0019029 A1 Jan. 18, 2018

(30) Foreign Application Priority Data
Jul. 15, 2016 (KR) .......................... 10-2016-0089982

(51) Int. Cl.
| | | |
|---|---|---|
| G21D 3/00 | (2006.01) | |
| G21C 17/00 | (2006.01) | |
| G21D 3/04 | (2006.01) | |
| G05B 19/042 | (2006.01) | |
| G06F 17/50 | (2006.01) | |
| G21D 3/06 | (2006.01) | |

(52) U.S. Cl.
CPC ......... *G21D 3/001* (2013.01); *G05B 19/0428* (2013.01); *G06F 17/5009* (2013.01); *G21C 17/00* (2013.01); *G21D 3/04* (2013.01); *G21D 3/06* (2013.01); *G06F 2217/78* (2013.01); *G21D 3/002* (2019.01); *Y02E 30/39* (2013.01)

(58) Field of Classification Search
None
See application file for complete search history.

(56) References Cited

U.S. PATENT DOCUMENTS 4,692,299 A    9/1987  Crew et al.
4,783,307 A *  11/1988 Galligan ................. G21C 7/36
                                                         376/216

FOREIGN PATENT DOCUMENTS

JP    09-311194 A    12/1997
JP    3892572 B2 *    3/2007
(Continued)

OTHER PUBLICATIONS

Communication dated Nov. 16, 2017 from the European Patent Office in counterpart European application No. 17173391.8.

*Primary Examiner* — Suzanne Lo
(74) *Attorney, Agent, or Firm* — INVENSTONE Patent, LLC (57) ABSTRACT

A system for simulating maintenance of a reactor core protection system that has at least two or more channels, includes: a simulation signal generation unit for generating a simulation state signal including a normal state or an abnormal state, a communication unit connected to each of the channels of the reactor core protection system to transmit the state signal to the channel, and a control unit for receiving a result signal output from the channel in response to the input simulation state signal and confirming whether the reactor core protection system normally determines a reactor core state by analyzing the result signal.

14 Claims, 8 Drawing Sheets
(1 of 8 Drawing Sheet(s) Filed in Color)

(56) References Cited

FOREIGN PATENT DOCUMENTS

| JP | 2015145855 A | * | 8/2015 |
|----|-------------|---|--------|
| KR | 10-2001-0037389 A | | 5/2001 |
| KR | 10-1469175 A | | 11/2014 |
| KR | 10-1473769 A | | 12/2014 |
| WO | 2015112304 A2 | | 7/2015 |

* cited by examiner

Figure 1a

Related Art

Figure 1b

Related Art

APPARATUS AND SYSTEM FOR SIMULATING MAINTENANCE OF REACTOR CORE PROTECTION SYSTEM

CROSS REFERENCE TO RELATED APPLICATION

The present application claims the benefit of Korean Patent Application No. 10-2016-0089982 filed in the Korean Intellectual Property Office on Jul. 15, 2016, the entire contents of which are incorporated herein by reference.

BACKGROUND

Field

The present disclosure relates to an apparatus and system for simulating maintenance of a reactor core protection system including at least two or more channels, the simulation apparatus including a simulation signal generation unit for generating a state signal including a normal state or an abnormal state, a communication unit connected to each of the channels of the reactor core protection system to transmit the state signal to the channel, and a control unit for receiving a result signal output from the channel in response to the input state signal and confirming whether the reactor core protection system normally determines a reactor core state by analyzing the result signal.

Background of the Related Art

Nuclear power generation is generation of electricity by operating a turbine generator using steam generated by boiling water using energy generated by a fission chain reaction. Since huge energy is generated as the energy needed for generating free particles by completely separating nucleons from atomic nuclei configured of protons and neutrons is emitted, the nuclear power generation is the most desirable power source capable of obtaining a lot of energy using an extremely small amount of fuel, and most countries in the world producing electricity use the nuclear power generation.

However, in the case of the nuclear power generation, a great danger is accompanied in using the nuclear energy, and thus a large number of safety devices are necessarily required together with control of highly trained experts. Particularly, in the case of the nuclear power generation, a state of a system for protecting the core of a reactor is most carefully inspected, and even in normal times when an accident of nuclear power generation does not occur, whether or not a nuclear power generator, sensing devices installed in the nuclear power generator and computing devices for analyzing the sensing devices properly operate should be confirmed.

Accordingly, a reactor core protection system corresponds to a system for monitoring a degree of nuclear reaction of the reactor core and controlling to shut down the reactor to protect the reactor core when an excessive state occurs.

Figure 1A:
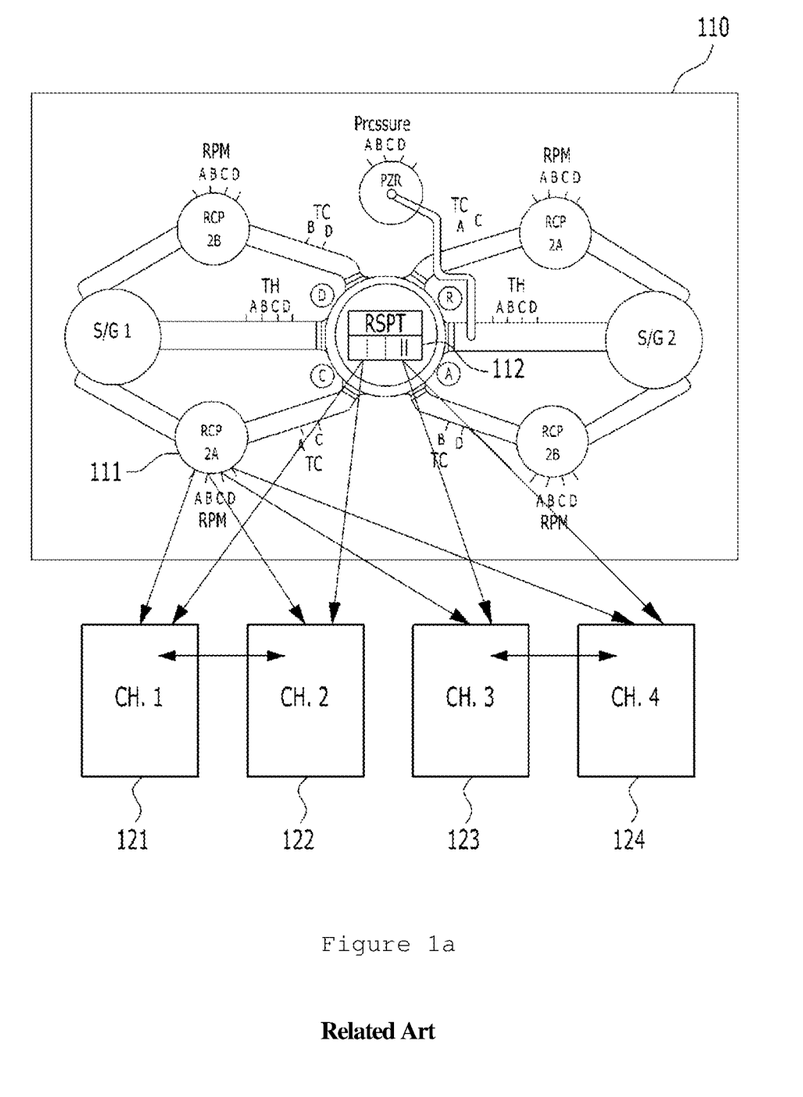
FIG. 1a is a view showing the configuration of a conventional reactor core protection system.

Referring to FIG. 1a, a conventional reactor 110 simultaneously senses various state signals through four different channels including first to fourth channels 121 to 124. At this point, the state signals carry various state data of the reactor of the nuclear power generator, including a temperature, a pressure, a rotation speed, a flow rate and the like. Since safety should be considered above all in the case of nuclear power generation, the conventional reactor transmits one state data to four different computing devices (channels) so that each computing device may determine abnormality of the state data.

At this point, it is designed to maintain electrical and physical independence among the channels in order to objectively grasp an abnormal state of the reactor, and if two or more channels simultaneously determine an abnormal situation after receiving the state data and generate a trip signal, countermeasures such as temporarily shutting down the reactor or the like will be taken. This is to cope with occurrence of a failure in the channels themselves, and although the first channel among the first to fourth channels is out of order and determined as an abnormal situation, if the second to fourth channels are determined as a normal situation, the reactor will not be shut down, and unnecessary waste of resources may be prevented.

Meanwhile, a control rod of a bar shape covered with a material easily absorbing thermal neutrons exists in the reactor core. In the case of the control rod, reactivity of nuclear fuel is adjusted by inserting and withdrawing the control rod into and out of the reactor core. If the control rod is inserted, reactivity of the reactor is lowered, and if the control rod is removed, reactivity of the reactor is increased. Accordingly, if an abnormal situation occurs in the reactor, the control rod is inserted for emergency shutdown of the reactor, and the reactor can be shut down by fully inserting the control rod.

Although a conventional reactor core protection system also confirms the position of the control rod 112 at all times, in the case of a control rod position signal, dozens of different signals should be sensed unlike the state data described above, such as a temperature, a pressure and the like, since one reactor includes a plurality of control rods, and thus control rod position signals are divided to be transmitted over two channels due to the limit of the channels in receiving signals. Accordingly, dozens of the control rod position signals are divided, and first and second channels 121 and 122 receive values of the divided signals, and third and fourth channels 123 and 124 receive values of the divided signals. Then, the first channel and the second channel exchange their values to make a final determination by integrating all the control rod position signals.

For example, if there are fifty control rod position signals in total, the first channel may receive thirty control rod position signals, and the second channel may receive twenty control rod position signals. Subsequently, the first channel transmits its thirty control rod position signals to the second channel, and the second channel transmits its twenty control rod position signals to the first channel. In conclusion, the first channel and the second channel respectively receive all the fifty control rod position signals and determine a normal state and an abnormal state. If an abnormal state is determined, a trip signal is generated, and a manager or an expert solves the corresponding abnormal state.

Meanwhile, in the case of a reactor, safety should be guaranteed by sensing a variety of state data in real-time as described above, and since huge damage may occur with only a single accident, it should be regularly confirmed whether the channels for sensing an abnormal state of a reactor properly work when an abnormal state occurs in the reactor. Accordingly, a simulation apparatus for simulating a signal generated in the reactor and inputting the signal in a channel and determining whether the channel properly responds is indispensable.

Figure 1B:
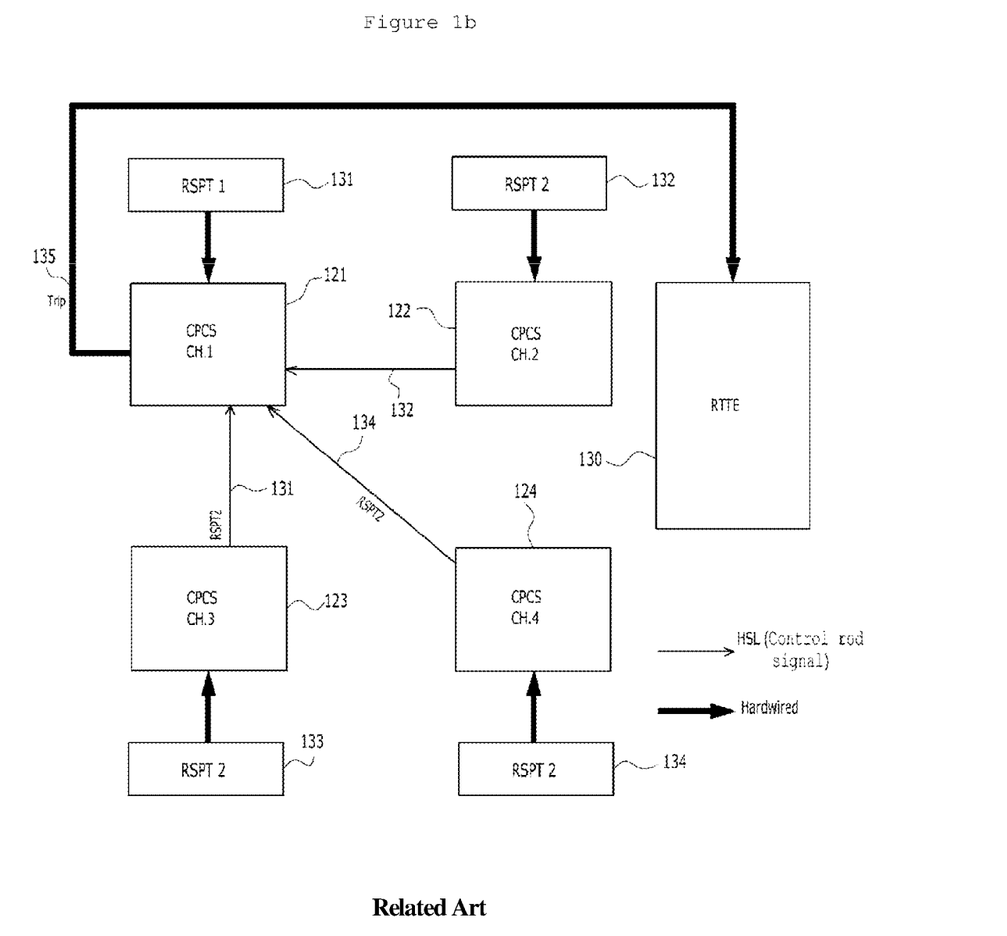
FIG. 1b is a view showing the conventional configuration of an apparatus for simulating maintenance of a reactor core protection system.

Referring to FIG. 1b, a sensing sequence of equipment for sensing a control rod position signal may be confirmed. Conventional response time test equipment (RTTE) 130 is connected to the first to fourth channels 121 to 124 and inputs a simulation state signal into the channels using the simulation apparatus. At this point, the simulation apparatus is connected to each of the channels and generates first to fourth control rod position signals 131 to 134.

The simulation apparatus inputs the first control rod position signal into the first channel 121 and the second control rod position signal into the second channel 122. The second channel 122 transfers the input second control rod position signal to the first channel 121, and the first channel 121 integrates the first control rod position signal and the second control rod position signal and finally determines an abnormal state. If it is determined as an abnormal state, the first channel 121 generates a trip signal 135 and transmits the trip signal to the simulation apparatus 130.

However, in the case of the conventional reactor core protection system, if a response time is measured for a situation of generating a trip signal by the first channel based on the control rod position signal transferred to the first channel 121 by way of the second channel 122, since the conventional simulation apparatus has a disadvantage of connecting only one simulation apparatus to one channel, the simulation apparatus itself cannot measure the response time, and the response time test equipment 130 should be used. Furthermore, there is a problem in that one simulation apparatus may simulate a state signal input into one channel.

Therefore, a simulation apparatus for inspecting the conventional reactor core protection system should use additional equipment to test a response time while connecting four channels and should connect hundreds of different resistors to a terminal block. In addition, the simulation should be conducted by connecting the simulation apparatus to a channel which will be tested mainly, using the response time test equipment for a control rod position signal which needs a signal change among the other channels and connecting resistors for the remaining control rod position signals.

Accordingly, the simulation apparatus for inspecting the conventional reactor core protection system may not conduct all the needed tests within an inspection time since a lot of time is consumed to set a test environment, and since existing external wires should be separated when the resistors are connected and wired again after the test is finished, this may induce a human error or a failure of the terminal block. Furthermore, there are restrictions in simulating various dynamic signals.

Furthermore, the simulation apparatus for inspecting the conventional reactor core protection system may change a simulation signal to a type such as a step signal, a ramp signal or the like only once, and a communication signal may delay a corresponding signal, and there is a problem in that a pump speed signal that should be simulated using a pulse signal cannot be dynamically simulated together with other signals and can be changed only individually.

SUMMARY

Therefore, the present disclosure has been made in view of the above problem of delaying a response time that a conventional simulation apparatus has, and it is an object of the present disclosure to provide an apparatus for simulating maintenance of a reactor core protection system, which improves the response time by supplying a simulation signal to all channels.

The technical problems to be accomplished by the present disclosure are not limited to the technical problems mentioned above, and various technical problems may be included within a scope apparent to those skilled in the art.

To accomplish the above object, according to one aspect of the present disclosure, there is provided an apparatus for simulating a reactor core protection system including at least two or more channels, the apparatus including: a simulation signal generation unit for generating a simulation state signal including a normal state or an abnormal state, a communication unit connected to each of the channels of the reactor core protection system to transmit the state signal to the channel, and a control unit for receiving a result signal output from the channel in response to the input simulation state signal and confirming whether the reactor core protection system normally determines a reactor core state by analyzing the result signal.

In addition, the apparatus for simulating a reactor core protection system according to an embodiment of the present disclosure is characterized in that the simulation signal generation unit generates the simulation state signal including at least any one of a reactor temperature, a reactor pressure, a hot leg temperature, a pump rotation speed, a neutron level, a flow rate and a reactor control rod position.

At this point, the apparatus for simulating a reactor core protection system according to an embodiment of the present disclosure is characterized in that the simulation signal generation unit generates first to fourth simulation state signals for the reactor control rod position, and the communication unit transmits the first simulation state signal to a first channel, the second simulation state signal to a second channel, the third simulation state signal to a third channel and the fourth simulation state signal to a fourth channel.

In addition, the apparatus for simulating a reactor core protection system according to an embodiment of the present disclosure is characterized in that the first simulation state signal includes twenty-three signals, and the second simulation state signal includes seventy signals.

In addition, the apparatus for simulating a reactor core protection system according to an embodiment of the present disclosure is characterized in that the simulation signal generation unit generates a simulation state signal of a form including at least any one of a ramp signal, a step signal, an impulse signal, a pulse signal and a sinusoidal signal.

In addition, the apparatus for simulating a reactor core protection system according to an embodiment of the present disclosure is characterized in that the communication unit transmits the simulation state signal to all the first to fourth channels of the reactor core protection system.

In addition, the apparatus for simulating a reactor core protection system according to an embodiment of the present disclosure is characterized in that the communication unit is connected to the reactor core protection system through a connector.

In addition, the apparatus for simulating a reactor core protection system according to an embodiment of the present disclosure may further include a response time test unit for measuring a time taken from transmission of the simulation state signal and reception of the result signal.

At this point, the apparatus for simulating a reactor core protection system according to an embodiment of the present disclosure is characterized in that if the response time is delayed longer than a preset standard response time after the response time test unit measures the response time, the control unit analyzes corresponding content.

In addition, the apparatus for simulating a reactor core protection system according to an embodiment of the present disclosure may further include a control rod position determination unit for receiving a control rod position signal of the reactor core protection system.

In addition, the apparatus for simulating a reactor core protection system according to an embodiment of the present disclosure may further include a control rod drop time test unit for measuring a drop time of a control rod when the control rod of the reactor core protection system is shut down according to a simulation abnormal state signal generated by the simulation signal generation unit.

At this point, the apparatus for simulating a reactor core protection system according to an embodiment of the present disclosure is characterized in that the control rod drop time test unit measures and stores all of the drop time of the control rod for each of the channels.

In addition, the apparatus for simulating a reactor core protection system according to an embodiment of the present disclosure is characterized in that the control unit determines whether the reactor core protection system normally determines a reactor core state according to the measured drop time of the control rod.

Meanwhile, according to another aspect of the present disclosure, there is provided a system for simulating maintenance of a reactor core protection system, the simulation system including: a simulation apparatus for generating a simulation state signal including a normal state or an abnormal state, and first to n-th channels included in the reactor core protection system and respectively connected to the simulation apparatus, in which the first to n-th channels receive the generated simulation state signal, output a result signal, and transmit the result signal to the simulation apparatus, and the simulation apparatus confirms whether the reactor core protection system normally determines a reactor core state by analyzing the result signal.

Meanwhile, according to another aspect of the present disclosure, there is provided a method of simulating maintenance of a reactor core protection system, the method including the steps of: generating a simulation state signal including a normal state or an abnormal state; transmitting the simulation state signal to at least two or more channels respectively connected to the reactor core protection system; receiving a result signal output from each of the channels in response to the input simulation state signal; and confirming whether the reactor core protection system normally determines a reactor core state by analyzing the result signal.

BRIEF DESCRIPTION OF THE DRAWINGS

The patent or application file contains at least one drawing executed in color. Copies of this patent or patent application with color drawing(s) will be provided by the Office upon request and payment of the necessary fee.

DESCRIPTION OF SYMBOLS

110: Conventional nuclear power generator
111: Conventional sensing device
112: Conventional reactor core
121: Conventional first channel
122: Conventional second channel
123: Conventional third channel
124: Conventional fourth channel
130: Conventional response time test equipment
131, 132, 133, 134: Conventional simulation apparatus
135: Trip signal generated by channel
200: Apparatus for simulating maintenance of reactor core protection system
210: Simulation signal generation unit
220: Communication unit
230: Control unit
240: Response time test unit
250: Control rod position determination unit
260: Control rod drop time test unit
310: First channel
320: Second channel
330: Third channel
340: Fourth channel
400: Nuclear power generator including reactor

DETAILED DESCRIPTION

Hereinafter, 'an apparatus for simulating maintenance of a reactor core protection system' according to the present disclosure will be described in detail with reference to the accompanying drawings. The disclosed embodiments are provided to enable those skilled in the art to easily understand the scope of the present disclosure, and the present disclosure is not limited by such embodiments. Moreover, matters illustrated in the drawings are schematized in order to describe or explain the embodiments of the present disclosure more easily and hence may be different from actually embodied forms.

Meanwhile, the constitutional components expressed below are merely examples for implementing the present disclosure. Accordingly, other constitutional components may be used in other implementations of the present disclosure without departing from the spirit and scope of the present invention.

In addition, the expression of 'including' a component is an expression of an 'open type' which merely refers to existence of a corresponding component, and it should not be construed as precluding additional components.

In addition, the expressions such as "first", "second" and the like are expressions used only to distinguish a plurality of constitutions and do not limit the sequence or other features of the constitutions.

In describing the embodiments, a description of forming a layer (film), region, pattern or structure "on" or "under" another substrate, layer (film), region, pad or pattern includes directly forming or interposing another layer. The reference of "on" or "under" of each layer is defined with respect to the drawings.

When an element is connected to another element, it includes a case of indirectly connecting the elements interposing another member therebetween, as well as a case of directly connecting the elements. In addition, when an element includes a component, it means further including another component, not excluding another component, as far as an opposed description is not specially specified.

Figure 2A:
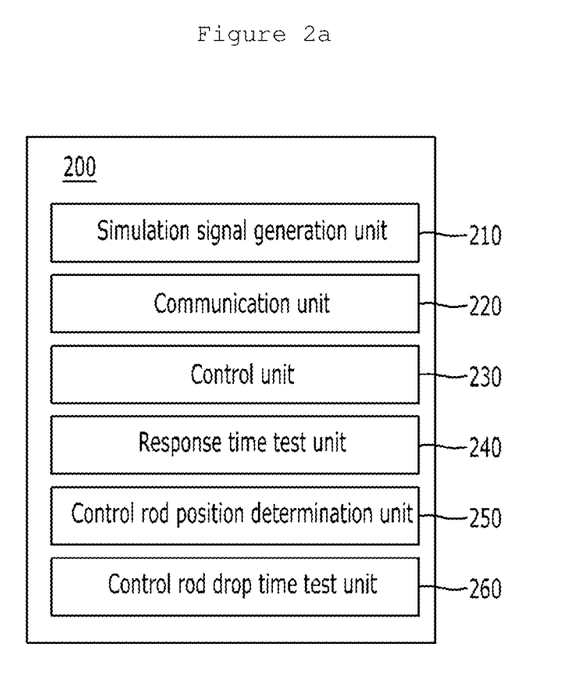
FIG. 2a is a view showing the configuration of a system for simulating maintenance of a reactor core protection system of the present disclosure.
Figure 2B:
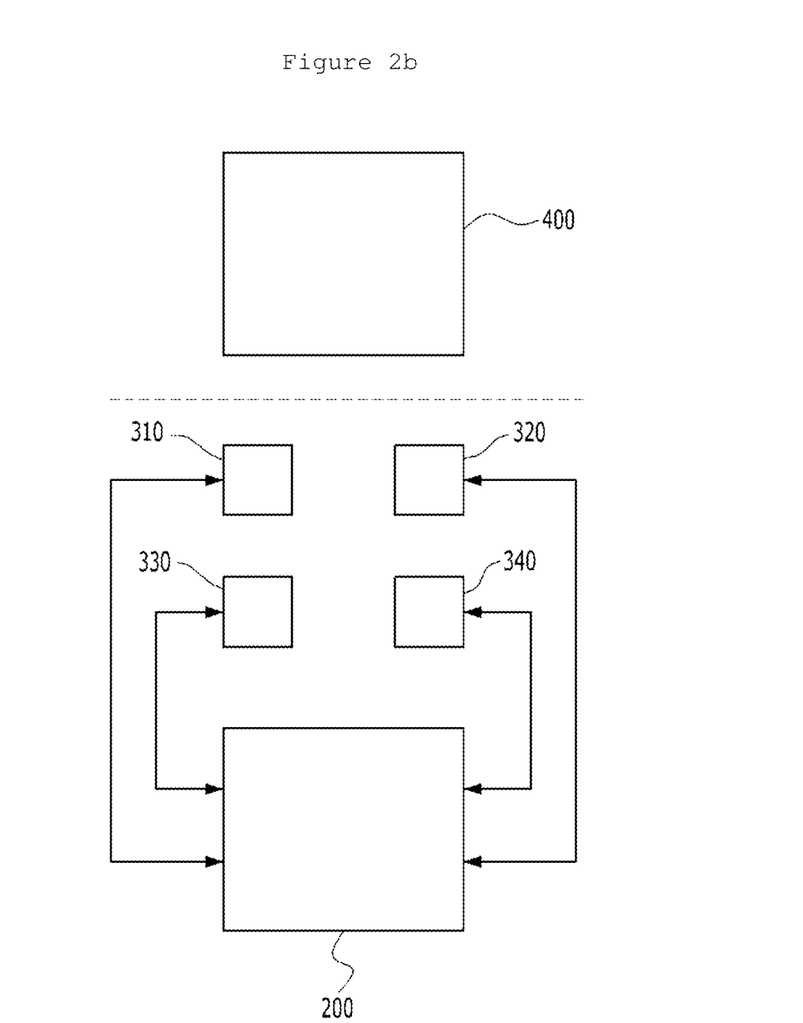
FIG. 2b is a view showing the configuration of an apparatus for simulating maintenance of a reactor core protection system of the present disclosure.

FIG. 2a is a view showing the configuration of a system for simulating maintenance of a reactor core protection system of the present disclosure, and FIG. 2b is a view showing the configuration of an apparatus for simulating maintenance of a reactor core protection system of the present disclosure.

Referring to FIG. 2b, a nuclear power generator 400 including a reactor of the present disclosure may include at least two or more channels and preferably include a first channel 310, a second channel 320, a third channel 330 and a fourth channel 340. When the nuclear power generator 400 is in operation, the first to fourth channels are connected to the nuclear power generator, receive state data generated by the nuclear power generator, and output a result signal. At this point, if the result signal is determined as an abnormal situation, the channels may generate a trip signal to inform a user or a manger of the abnormal situation and shut down the nuclear power generator by dropping a control rod.

The first to fourth channels may be implemented using a computing device and output a result signal for the state signal generated by the nuclear power generator. In addition, although a process signal input into the first to fourth channels is quadrupled 1, 2, 3 and 4 to input one signal into each of the four channels, a control rod position signal may be duplicated RSPT1 and RSPT2.

In addition, the first to fourth channels may include a core protection processor for executing a main algorithm of the reactor core protection system, such as calculation of DNBR, LPD or the like, a control rod assembly processor for collecting control rod assembly position signals and calculating a position signal deviation in each group or sub-group, a channel communication processor for collecting control rod position signals and transferring the control rod position signals to other channels, and transferring an overall signal including signals received from other channels to the control rod assembly processor, an interface test processor for transmitting various process variables received from other racks in a channel to the Qualified Indication and Alarm System-Non safety (QIAS-N), an operator module capable of monitoring major variables and changing set values, and a maintenance and test panel for performing periodic surveillance test and monitoring major variables.

At this point, the channels are physically and electrically separated, and each of the channels independently derive its own result signal, and thus if two or more channels determine an abnormal situation, it is finally determined as an abnormal situation of the nuclear power generator.

More specifically, the first to fourth channels may confirm an abnormal situation by exchanging inputted control rod position signals with each other, and an abnormal situation determination unit of each channel may receive a control rod position signal and a state signal, confirm deviation of a state in each group, calculate a penalty factor based on the deviation, and transmit the penalty factor to all the channels through HR-SDL communication.

The apparatus 200 for simulating maintenance of a reactor core protection system of the present disclosure is connected to the first to fourth channels during the maintenance period and operates to maintain the first to fourth channels connected to the nuclear power generator 400 to sense an abnormal situation of the reactor. Details of the configuration and technical content of the apparatus for simulating maintenance of a reactor core protection system will be described with reference to FIG. 2a.

Referring to FIG. 2a, the apparatus 200 is for simulating maintenance of a reactor core protection system of the present disclosure, the reactor core protection system including at least two or more channels. The simulation apparatus 200 is an electronic control unit that includes a central processing unit (CPU), read only memory (ROM), random access memory (RAM), and the like. The apparatus 200 executes various controls by loading programs stored in the ROM on the RAM and causing the CPU to execute the programs. The simulation apparatus 200 may be configured from a plurality of electronic control units. For example the simulation apparatus 200 may include a simulation signal generation unit 210, a communication unit 220, a control unit 230, a response time test unit 240, a control rod position determination unit 250 and a control rod drop time test unit 260.

The simulation signal generation unit 210 may generate a simulation state signal including a normal state or an abnormal state. At this point, the simulation signal generation unit may generate a simulation state signal including at least any one of a reactor temperature, a reactor pressure, a hot leg temperature, a pump rotation speed, a neutron level, a flow rate and a reactor control rod position.

In addition, the communication unit 220 is connected to each of the channels of the reactor core protection system and may transmit the simulation state signal to the channels. At this point, the communication unit may transmit the simulation state signal to all the first to fourth channels of the reactor core protection system. Unlike the conventional disclosure of connecting one simulation apparatus to only one channel, since the simulation apparatus of the present disclosure may transmit the simulation state signal to a plurality of channels, the simulation can be conducted without separate equipment.

In addition, the simulation signal generation unit of the present disclosure may generate first to fourth simulation state signals for the reactor control rod position. Since a system for simulating maintenance of a reactor core protection system of the present disclosure may include first to fourth channels, the simulation signal generation unit of the present disclosure may individually generate a signal that can be input into each channel and input the signal into the channel.

At this point, the communication unit may transmit the first simulation state signal to the first channel, the second simulation state signal to the second channel, the third simulation state signal to the third channel and the fourth simulation state signal to the fourth channel. Since the communication unit transmits the simulation state signal generated by the simulation signal generation unit to a relevant channel, the channel determines an abnormal situation by outputting a result signal for a corresponding simulation state signal.

Particularly, of the simulation state signal generated by the simulation signal generation unit of the present disclosure, the first simulation state signal may include twenty-three signals, and the second simulation state signal may include seventy signals. The first to fourth simulation state signals correspond to a simulation state signal for a control rod position, and since a plurality of control rods may be included in one reactor of a nuclear power generator, the simulation signal generation unit generates ninety-three different simulation state signals, appropriately distributes the simulation state signals among the channels to be processed by each channel, and separately inputs twenty-three signals and seventy signals into each channel.

In addition, the simulation signal generation unit of the present disclosure may generate a simulation state signal of a form including at least any one of a ramp signal, a step signal, an impulse signal, a pulse signal and a sinusoidal signal. Since a simulation can be properly conducted only when the simulation signal generation unit of the present disclosure generates a state signal of a form the same as that of a state signal generated by the nuclear power generator, the simulation signal generation unit is able to generate a state signal of all possible forms.

More specifically, the simulation signal generation unit of the present disclosure may generate a simulation signal of a form that can be generally used in a signal, such as a sinusoidal signal of a sinusoidal waveform of a trigonometric function, a ramp signal proportionally increasing after a predetermined time, a step signal outputting a constant value after a predetermined time, an impulse signal inputting an infinite value at a specific time, and a pulse signal.

Particularly, unlike the disadvantage of the conventional simulation apparatus capable of changing a signal only once and incapable of dynamic simulation together with another signal at the same time, since the simulation signal generation unit of the present disclosure may simulate various forms of signals, including a hard wire signal and a communication signal, an unlimited number of times at a desired time, it may generate all forms of state signals generated by the nuclear power generator.

In addition, the communication unit of the present disclosure may be connected to the reactor core protection system through a connector. Since the apparatus for simulating maintenance of a reactor core protection system of the present disclosure may generate all kinds of responses using only a simulator, it may progress a simulation by connecting a hard wire to the system through a connector without the need of separate equipment such as response time test equipment (RTTE) or resistors of the terminal block.

The control unit 230 may receive a result signal output from the channel in response to the input simulation state signal and confirm whether the reactor core protection system normally determines a reactor core state by analyzing the result signal. Since the object of the apparatus for simulating a reactor core protection system of the present disclosure is to confirm whether the first to fourth channels properly operate, the control unit confirms whether an output signal corresponding to the input simulation state signal is properly output from each of the channels.

For example, after the simulation signal generation unit of the present disclosure inputs an abnormal state simulation signal into the first channel and a normal state simulation signal into the second to fourth channels, a normal state output signal may be received from all of the channels. After receiving corresponding content, the control unit of the present disclosure may determine that the first channel is out of order and inform a manager or a maintenance technician of the corresponding content using an e-mail or a text message.

In addition, the control unit of the present disclosure may confirm whether the reactor core protection system suspends output of the trip signal. For example, if the simulation signal generation unit simulates twelve single control rod drops and a Reactor Power Cutback (RPC) request signal is output from the reactor core protection system, the control unit may confirm whether the reactor core protection system suspends the trip signal by subsequently inserting the control rod for reactor power cutback.

The response time test unit 240 may measure a time taken from transmission of the simulation state signal to reception of the result signal. Since the apparatus for simulating maintenance of a reactor core protection system of the present disclosure performs a function of confirming how fast a result signal is output in response to the simulation state signal input from each channel, the response time is measured through the response time test unit.

At this point, if the response time test unit measures the response time and the response time is delayed longer than a preset standard response time, the control unit may analyze corresponding content.

For example, if the time taken from transmission to reception and measured by the response time test unit of the present disclosure is 3500 ms when the preset standard response time is 5000 ms, the control unit of the present disclosure determines that the first to fourth channels operate normally. In addition, if the time taken from transmission to reception and measured by the response time test unit is 7000 ms, the control unit of the present disclosure confirms a channel of the delayed response time and determines that the third channel, which is the delayed channel, is out of order and informs a manager or a technical expert of corresponding content through an e-mail or a text message.

Figure 3:
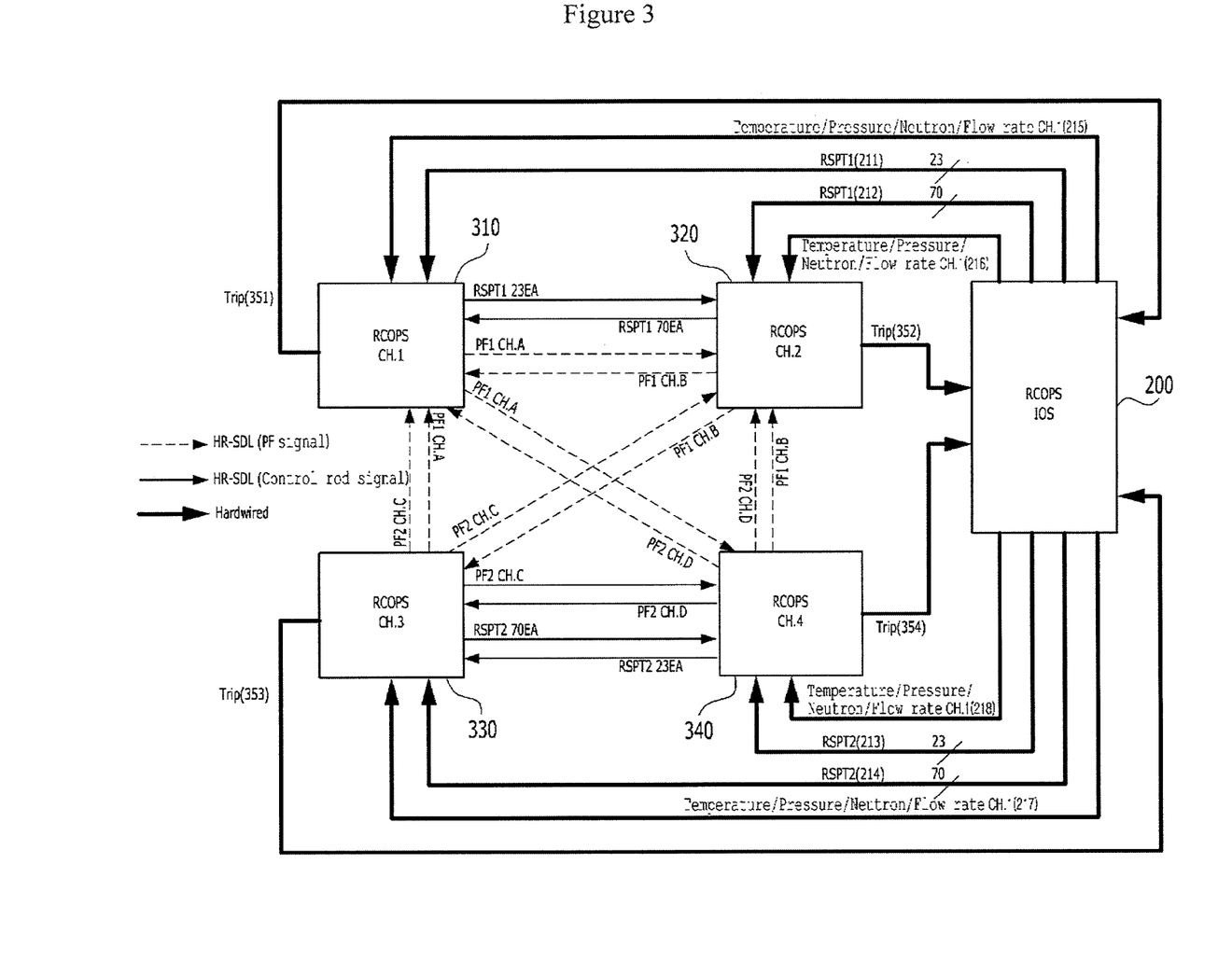
FIG. 3 is a view showing the configuration of a simulation method of an apparatus for simulating maintenance of a reactor core protection system of the present disclosure.

FIG. 3 is a view showing the configuration of a simulation method of an apparatus for simulating maintenance of a reactor core protection system of the present disclosure.

Referring to FIG. 3, this is an exemplary view showing a sequence of a simulation conducted by the apparatus for simulating maintenance of a reactor core protection system of the present disclosure. The simulation apparatus 200 may generate a simulation state signal that can be input into a first channel 310, a second channel 320, a third channel 330 and a fourth channel 340.

At this point, the simulation state signal may include a first simulation state signal 211 for the position of a reactor control rod, a second simulation state signal 212 for the position of a reactor control rod, a third simulation state signal 213 for the position of a reactor control rod, and a fourth simulation state signal 214 for the position of a reactor control rod and may include a first simulation state signal 215, a second simulation state signal 216, a third simulation state signal 217 and a fourth simulation state signal 218 including general information such as a temperature, a pressure, a neutron level, a flow rate and the like.

The simulation apparatus 200 may generate twenty-three of the first simulation state signal 211 for the position of a reactor control rod and transmit the first simulation state signals to the first channel 310 and may generate seventy of the second simulation state signal 212 for the position of a reactor control rod and transmit the second simulation state signals to the second channel 320. At this point, the first channel 310 may transmit twenty-three received first simulation state signals to the second channel 320, and the second channel 320 may transmit seventy received second simulation state signals to the first channel 310. At this point, communication between the first channel and the second channel may be accomplished through HR-SDL signals, and signal exchange can be conducted in a speedy way since communication between PCs is allowed.

The first channel 310 and the second channel 320 analyze the first simulation state signal for the position of a reactor control rod and the second simulation state signal for the position of a reactor control rod received from each other and respectively generate a result signal. At this point, if the first simulation state signal for the position of a reactor control rod is determined as an abnormal state, each of the channels generates a trip signal 351 and 352 and transmits the trip signal to the simulation apparatus 200.

The third channel 330 and the fourth channel 340 also determine a simulation state signal received from the simulation apparatus in a method the same as the signal exchange method of the first channel 310 and the second channel 320.

In addition, a method of communicating between the channels includes a link method, a network method, a HR-SDL method, a HR-SDN method or the like, and communication between the channels may be accomplished in the various methods.

The link or HR-SDL method performs peer-to-peer communication and may be used for an important data link for transmitting a control signal related to safety, such as a trip signal. At this point, a self-diagnosis, a variety of set values and constant values, a trip, a preliminary trip and the like may be transmitted to a processor, and whether or not the signals meet safety requirements may be determined.

The network or HR-SDN method performs computer network communication and corresponds to one-to-many communication for controlling a plurality of apparatuses connected to a network by one central control apparatus.

In addition, the apparatus for simulating maintenance of a reactor core protection system of the present disclosure may be used to train beginner operators or trainees of the reactor core protection system, in addition to conducting a maintenance simulation. Only experienced operators may operate the reactor core protection system, and verification on the channels may be performed using the simulation apparatus of the present disclosure before using the reactor core in order to perfectly guarantee a safety system of the reactor core. In addition, a beginner operator or a trainee, who operates the reactor core protection system for the first time, as well as an experienced operator, may confirm how the reactor core protection system operates the safety system, and the simulation apparatus may be used as a training material for confirming the types of information collected from the reactor and the types of logic for shutting down the reactor.

Figure 4:
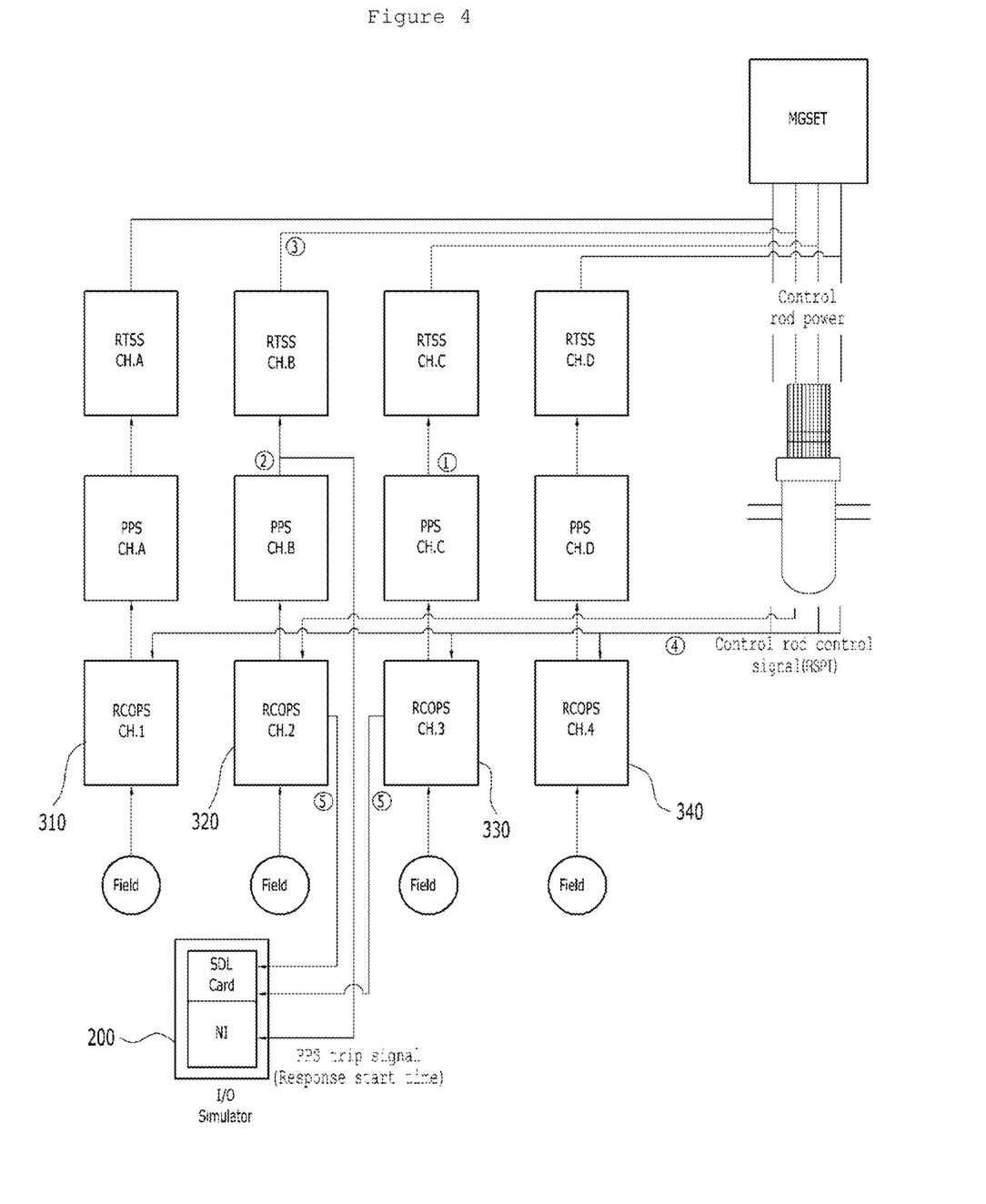
FIG. 4 is a view showing the configuration of measuring a control rod position drop response time of an apparatus for simulating maintenance of a reactor core protection system of the present disclosure.
Figure 5:
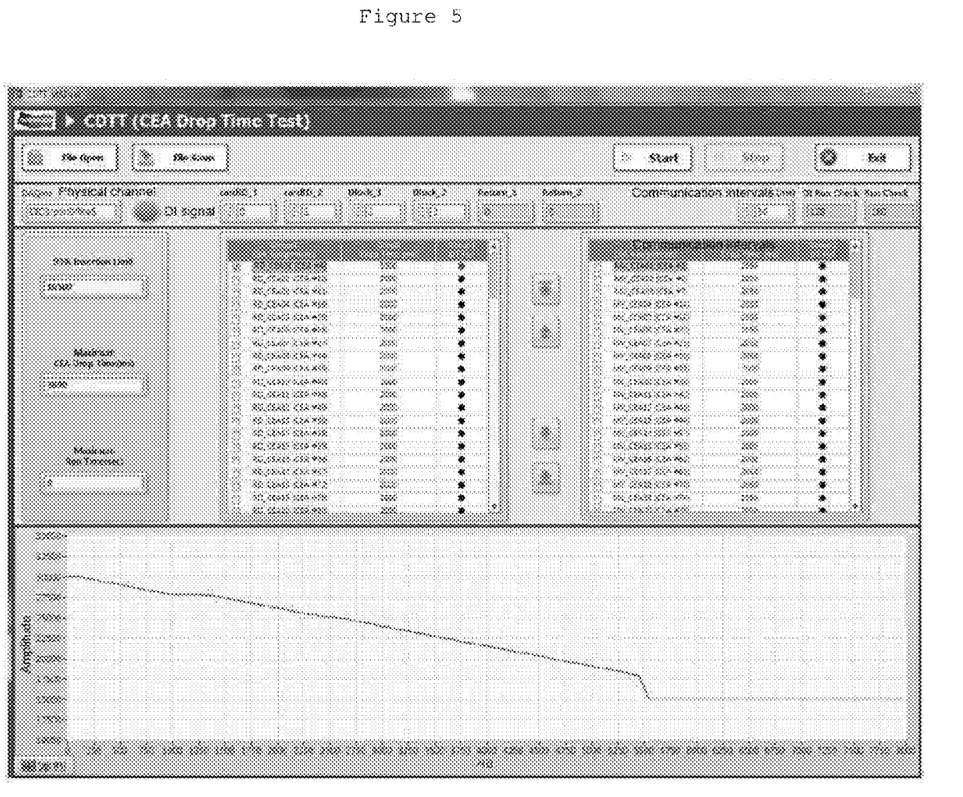
FIG. 5 is a view showing a graph measuring a control rod position drop response time of an apparatus for simulating maintenance of a reactor core protection system of the present disclosure.

FIG. 4 is a view showing the configuration of measuring a control rod position drop response time of an apparatus for simulating maintenance of a reactor core protection system of the present disclosure, and FIG. 5 is a view showing a graph measuring a control rod position drop response time of an apparatus for simulating maintenance of a reactor core protection system of the present invention.

The apparatus for simulating maintenance of a reactor core protection system of the present disclosure may further include a control rod position determination unit 250 and a control rod drop time test unit 260.

The control rod position determination unit 250 may receive a control rod position signal of the reactor core protection system, and the control rod drop time test unit 260 may measure a drop time of the control rod when the control rod of the reactor core protection system is shut down according to a simulation abnormal state signal generated by the simulation signal generation unit.

At this point, in order to sense movement of the control rod, the control rod position determination unit may configure a 1 kΩ resistor, one hundred of 10Ω resistors and a 1 kΩ resistor in series and configure the resistors so that the total resistance may vary among the one hundred of 10Ω resistors according to the movement of the control rod. Accordingly, since the total resistance value varies according to the position of the control rod, determination of the position of the control rod may be efficiently performed by adjusting the applied voltage out of the supply voltage of 15V to have a value between 5 and 10V.

At this point, the control rod drop time test unit may measure and store all of the drop time of the control rod for each of the channels. In addition, the control unit may determine whether the reactor core protection system normally determines a reactor core state according to the measured drop time of the control rod.

A control rod of a bar shape covered with a material easily absorbing thermal neutrons exists in the reactor core. In the case of the control rod, reactivity of nuclear fuel is adjusted by inserting and withdrawing the control rod into and out of the reactor core, and if the control rod is inserted, reactivity of the reactor is lowered, and if the control rod is removed, reactivity of the reactor is increased. Accordingly, if an abnormal situation occurs in the reactor, the control rod is inserted for emergency shutdown of the reactor, and the reactor may be shut down by fully inserting the control rod.

Accordingly, the apparatus for simulating maintenance of a reactor core protection system of the present disclosure may determine the current position of the control rod placed in the reactor core and measure performance of the reactor core protection system by measuring drop time of the control rod for fast shutdown of the reactor when an abnormal situation occurs in the reactor.

In addition, whether a time counted from the time point of generating the trip signal of the reactor core protection system (PPS) until 90% of the control rod is inserted is in a permitted range can be confirmed. At this point, one-to-one communication signals between controllers in the reactor core protection system are connected to the simulation apparatus to measure the time.

Referring to FIG. 4, the configuration of measuring a control rod position drop response time of the apparatus for simulating maintenance of a reactor core protection system may be confirmed. A system for receiving a control rod position signal from a RSPT signal corresponds to the reactor core protection system, and the apparatus for simulating a reactor core protection system should receive information on the control rod position signal from the reactor core protection system to perform a control rod drop test.

The internal structure of the reactor core protection system is a structure in which the CCP transfers total ninety-three pieces of information on the control rod position of RSPT1 and RSPT2 to the CEAP, and since the transmission port of the HR-SDL card of the controller is duplicated, the apparatus for simulating maintenance of a reactor core protection system may receive a signal the same as the control rod position signal transferred to the CEAP through an unused port. The apparatus for simulating maintenance of a reactor core protection system of the present disclosure applies a HR-SDL card for PC to directly receive the signal, records all the ninety-three RSPT1 signals and ninety-three RSPT2 signals every 50 ms, and determines whether the control rod has dropped within the permitted range of time.

Referring to FIG. 4, first, the simulation apparatus artificially generates an abnormal state signal and inputs the signal into the PPS apparatus connected to two or more channels ① and ②, and the apparatus for simulating maintenance of a reactor core protection system of the present disclosure generates a trip signal. Subsequently, since an abnormal situation has been occurred in two or more channels, the RTSS apparatus connected to the PPS apparatus transmits the trip signal to shut down the reactor by dropping the control rod in the reactor ③. Subsequently, a control rod position signal RSPT is transmitted to the first to fourth channels 310 to 340 ④, and the first to fourth channels sense a corresponding control rod position signal and transmit values measuring the current position and the drop time of the control rod to the simulation apparatus ⑤.

Referring to FIG. 5, when the control rod of the reactor core protection system of the present disclosure is shut down, a value measuring the drop time of the control rod can be confirmed. The control rod gradually drops as the control rod is shut down, and finally, the control rod is completely dropped to the bottom after about 5500 ms.

In addition, the control rod position determination unit of the present disclosure may receive a control rod position signal from one of two channels among the first to fourth channels and receive a control rod position signal from one of two other channels. Since the first and second channels receive a control rod position signal and the third and fourth channels receive another control rod position signal, the control rod position determination unit of the present disclosure may receive two different control rod position signals.

Meanwhile, a system for simulating maintenance of a reactor core protection system of the present disclosure includes a simulation apparatus for generating a simulation state signal including a normal state or an abnormal state, and first to n-th channels included in the reactor core protection system and respectively connected to the simulation apparatus, in which the first to n-th channels receive the generated simulation state signal, output a result signal, and transmit the result signal to the simulation apparatus, and the simulation apparatus confirms whether the reactor core protection system normally determines a reactor core state by analyzing the result signal.

Figure 6:
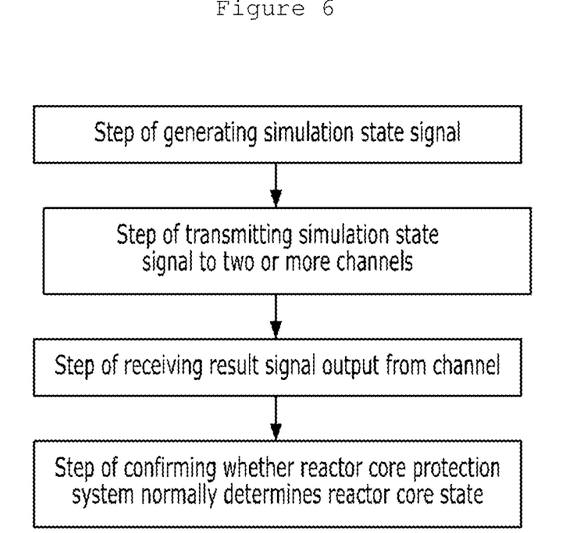
FIG. 6 is a flowchart illustrating a method of simulating maintenance of a reactor core protection system of the present disclosure.

FIG. 6 is a flowchart illustrating a method of simulating maintenance of a reactor core protection system of the present disclosure.

Referring to FIG. 6, a method of simulating maintenance of a reactor core protection system according to an embodiment of the present disclosure may include the steps of generating a simulation state signal including a normal state or an abnormal state, transmitting the simulation state signal to at least two or more channels respectively connected to the reactor core protection system, receiving a result signal output from each of the channels in response to the input simulation state signal, and confirming whether the reactor core protection system normally determines a reactor core state by analyzing the result signal.

At this point, diverse components that can be applied to the apparatus for simulating maintenance of a reactor core protection system described above can be applied to the system for simulating maintenance of a reactor core protection system and the method of simulating maintenance of a reactor core protection system of the present disclosure.

Meanwhile, the system for simulating maintenance of a reactor core protection system of the present disclosure may perform an additional function for a configuration of inputting a simulation situation in the form of a power graph by a user or a manager and a behavior of the simulation apparatus conducted according to a virtual power input pattern.

The control rod may be dropped or maintain its position according to a value of the power applied to the simulation system, and such a power value may be changed to an arbitrary value with respect to time. For example, it may be controlled to apply 5V between zero and one seconds, 10V between one and two seconds, and 0V between two and three seconds so that a simulation situation may be implemented using the system in each situation.

In addition, when the reactor of the present disclosure includes twelve control rods, there may be an occasion of performing a simulation of dropping all the twelve control rods. However, since the reactor will be shut down even when only one control rod is dropped and wasted time and cost will be great if the reactor is really shut down, a simulation of shutting down the reactor when a few number of control rods are dropped may be configured through the simulation system.

Since the apparatus for simulating maintenance of a reactor core protection system of the present disclosure may support input and output signals for all the four channels, as well as one channel, of the reactor core protection system, a rapid simulation can be conducted by reducing a response time between the input of a simulation state signal and the output of a result signal.

In addition, since the apparatus for simulating maintenance of a reactor core protection system of the present disclosure may simulate both a hard wire signal and a communication signal among input and output signals, two hundred or more different state signals of four channels may be input.

In addition, the apparatus for simulating maintenance of a reactor core protection system of the present disclosure may conveniently progress a simulation since all simulations can be conducted only with the simulation apparatus without the need of an additional work of using response time test equipment (RTTE) or the like or inserting resistors in a terminal block.

In addition, the apparatus for simulating maintenance of a reactor core protection system of the present disclosure may simulate various forms of signals (a ramp signal, a step signal and the like), including a hard wire signal or a communication signal, an unlimited number of times at a desired time.

In addition, the apparatus for simulating maintenance of a reactor core protection system of the present disclosure may simulate various design basis accidents or various movements of a control rod may and conduct a variety of tests while all the channels are connected.

In addition, the apparatus for simulating maintenance of a reactor core protection system of the present disclosure may reduce overall control rod drop test time and minimize the probability of malfunction at the site of a reactor by adding various test functions.

In addition, the apparatus for simulating maintenance of a reactor core protection system of the present disclosure may greatly reduce the total test time including a time for setting a test environment and immediately display a control rod position signal received through measurement of a control rod drop time on a test screen.

In addition, the apparatus for simulating maintenance of a reactor core protection system of the present disclosure may be used to construct a reactor core protection system by measuring a position and a drop speed of a control rod using a method of confirming a position of a control rod when a state of the reactor is confirmed.

The embodiments of the present disclosure described above are disclosed for illustrative purposes, and the present invention is not limited thereto. In addition, those skilled in the art may make diverse modifications and changes within the spirit and scope of the present invention, and all the modifications and changes should be regarded as belonging to the scope of the present invention.

What is claimed is:

1. An apparatus for simulating maintenance of a reactor core protection system including at least two or more channels, the apparatus comprising:
a simulation signal generation unit configured to generate simulation state signals including a normal state or an abnormal state,
a communication unit connected to each of the channels of the reactor core protection system and configured to transmit each of the state signals to each of the channels, and
a control unit configured to receive output signals output from each of the channels in response to the input simulation state signals and to determine whether the channels are normally operated by analyzing the output signals,
wherein the simulation signal generation unit generates a first, a second, a third, and a fourth simulation state signals for a reactor control rod position, and the communication unit transmits the first simulation state signal to a first channel, the second simulation state signal to a second channel, the third simulation state signal to a third channel and the fourth simulation state signal to a fourth channel, and
wherein at least one of the simulation signal generation unit, the communication unit, and the control unit is implemented as a hardware component.

2. The apparatus according to claim 1, wherein the simulation signal generation unit generates the simulation state signals including at least any one of a reactor temperature, a reactor pressure, a hot leg temperature, a pump rotation speed, a neutron level, a flow rate and the reactor control rod position.

3. The apparatus according to claim 1, wherein the first simulation state signal includes twenty-three signals, and the second simulation state signal includes seventy signals.

4. The apparatus according to claim 1, wherein the simulation signal generation unit generates a simulation state signal of a form including at least any one of a ramp signal, a step signal, an impulse signal, a pulse signal and a sinusoidal signal.

5. The apparatus according to claim 1, wherein the reaction core protection system includes a first, a second, a third, and a fourth channels, and the communication unit transmits the simulation state signals to the first, the second, the third, and the fourth channels of the reactor core protection system.

6. The apparatus according to claim 1, wherein the communication unit is connected to the reactor core protection system through a connector.

7. The apparatus according to claim 1, further comprising a response time test unit configured to measure a response time taken from transmission of the simulation state signals and reception of the output signals.

8. The apparatus according to claim 7, wherein if the response time is delayed longer than a preset standard response time, the control unit analyzes corresponding content.

9. The apparatus according to claim 1, further comprising a control rod position determination unit configured to receive control rod position signals for the channels of the reactor core protection system.

10. The apparatus according to claim 9, further comprising a control rod drop time test unit configured to measure a drop time of a control rod when the reactor core protection system is shut down according to a simulation abnormal state signal generated by the simulation signal generation unit.

11. The apparatus according to claim 10, wherein the control rod drop time test unit measures and stores all of the drop time of each of the control rods for each of the channels.

12. The apparatus according to claim 10, wherein the control unit determines whether the channels are normally operated according to the measured drop time of the control rod.

13. A system for simulating maintenance of a reactor core protection system, the simulation system comprising:
a simulation apparatus configured to generate simulation state signals including a normal state or an abnormal state, and
a plurality of channels included in the reactor core protection system, each of the channels being connected to the simulation apparatus,
wherein the plurality of channels receive the generated simulation state signals, output output signals, and transmit the output signals to the simulation apparatus, and
the simulation apparatus determines whether the channels are normally operated by analyzing the output signals,
wherein the simulation apparatus generates a first, a second, a third, and a fourth simulation state signals for a reactor control rod position, and the simulation apparatus transmits the first simulation state signal to a first channel, the second simulation state signal to a second channel, the third simulation state signal to a third channel and the fourth simulation state signal to a fourth channel, and
wherein at least one of the simulation signal apparatus and the plurality of channels is implemented as a hardware component.

14. A method of simulating maintenance of a reactor core protection system, the method comprising the steps of:
generating, using a simulation signal generation unit, simulation state signals including a normal state or an abnormal state;
transmitting, using a communication unit, the simulation state signals to at least two or more channels each of which are connected to the reactor core protection system;
receiving, using a control unit, output signals output from each of the channels in response to the input simulation state signals; and
determining, using the control unit, whether the channels are normally operated by analyzing the output signals,
wherein the generating comprises generating a first, a second, a third, and a fourth simulation state signals for a reactor control rod position, and the transmitting comprises transmitting the first simulation state signal to a first channel, the second simulation state signal to a second channel, the third simulation state signal to a third channel and the fourth simulation state signal to a fourth channel.

* * * * *